(12) United States Patent
Kaneko (10) Patent No.: US 11,696,044 B2
(45) Date of Patent: Jul. 4, 2023

(54) IMAGE CAPTURING APPARATUS, CONTROL METHOD, AND STORAGE MEDIUM

(71) Applicant: CANON KABUSHIKI KAISHA, Tokyo (JP)

(72) Inventor: Seigo Kaneko, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/705,069

(22) Filed: Mar. 25, 2022

(65) Prior Publication Data

US 2022/0311982 A1 Sep. 29, 2022

(30) Foreign Application Priority Data

Mar. 29, 2021 (JP) .................. 2021-054574

(51) Int. Cl.
| | |
|---|---|
| *H04N 9/73* | (2023.01) |
| *H04N 5/232* | (2006.01) |
| *H04N 23/88* | (2023.01) |
| *H04N 9/64* | (2023.01) |
| *H04N 23/71* | (2023.01) |
| *H04N 23/72* | (2023.01) |
| *H04N 23/84* | (2023.01) |

(52) U.S. Cl.
CPC .............. *H04N 23/88* (2023.01); *H04N 9/646* (2013.01); *H04N 23/71* (2023.01); *H04N 23/72* (2023.01); *H04N 23/84* (2023.01)

(58) Field of Classification Search
CPC ...... H04N 1/6077; H04N 1/6086; H04N 9/73; H04N 9/735; H04N 23/70–76
USPC .......................................... 348/223.1
See application file for complete search history.

(56) References Cited

U.S. PATENT DOCUMENTS

| | | | |
|---|---|---|---|
| 8,958,640 B1* | 2/2015 | McNerney | H04N 9/73 |
| | | | 382/167 |
| 11,323,676 B2* | 5/2022 | Romanenko | H04N 9/04557 |
| 2006/0291844 A1* | 12/2006 | Kakkori | G03B 9/28 |
| | | | 396/335 |

FOREIGN PATENT DOCUMENTS

| | | | |
|---|---|---|---|
| JP | 2014192152 A | 10/2014 | |
| JP | 6075393 B2 | 2/2017 | |
| WO | 2014192150 A1 | 12/2014 | |
| WO | WO-2019001163 A1 * | 1/2019 | ........... H04N 5/2351 |

* cited by examiner

*Primary Examiner* — Anthony J Daniels
(74) *Attorney, Agent, or Firm* — Canon U.S.A., Inc. IP Division (57) ABSTRACT

An image capturing apparatus includes an image sensor configured to change an exposure condition for each of a plurality of exposure areas, each of the exposure areas including a single pixel or a plurality of pixels, and an image processing unit configured to perform steps of digital signal processing on a signal of a captured image includes generating a plurality of coupled areas in which the exposure areas are coupled based on a first threshold of the exposure condition, calculating a development parameter for each of the coupled areas, and applying the development parameter to the image processing unit for each of the exposure areas.

19 Claims, 5 Drawing Sheets

IMAGE CAPTURING APPARATUS, CONTROL METHOD, AND STORAGE MEDIUM

BACKGROUND

Field of the Disclosure

The present disclosure relates to an image capturing apparatus, a control method, and a storage medium.

Description of the Related Art

Japanese Patent Application No. 2014-557907 discusses a technique that performs, in a configuration in which an exposure condition is changeable for each of areas of an image sensor, white balance processing for each of the areas.

SUMMARY

According to an aspect of the present disclosure, an image capturing apparatus includes an image sensor configured to change an exposure condition for each of a plurality of exposure areas, each of the exposure areas including a single pixel or a plurality of pixels, and an image processing unit configured to perform steps of digital signal processing on a signal of a captured image, comprising generating a plurality of coupled areas in which the exposure areas are coupled based on a first threshold of the exposure condition, calculating a development parameter for each of the coupled areas, and applying the development parameter to the image processing unit for each of the exposure areas.

Further features of the present invention will become apparent from the following description of exemplary embodiments with reference to the attached drawings.

DESCRIPTION OF THE EMBODIMENTS

A method of acquiring a white balance evaluation value and a method of correcting the white valance evaluation value according to a first exemplary embodiment are described below with reference to FIG. 1 to FIG. 4. The white balance evaluation value is one of development parameters. The description in the exemplary embodiment of the present specification is about white balance; however, the development parameter can be a development parameter for color signal processing relating to colors, or a development parameter to correct saturation or a color phase, without being limited to the white balance. The white balance according to the present exemplary embodiment is auto white balance (AWB), and a white balance evaluation value is automatically acquired.

In the present exemplary embodiment, in a case where one image capturing apparatus simultaneously captures images of areas illuminated by different light sources under an image capturing environment where the areas are different in color appearance caused by the different light sources, a method of calculating the white balance evaluation value and a method of image processing based on the calculated evaluation value are described.

Figure 1:
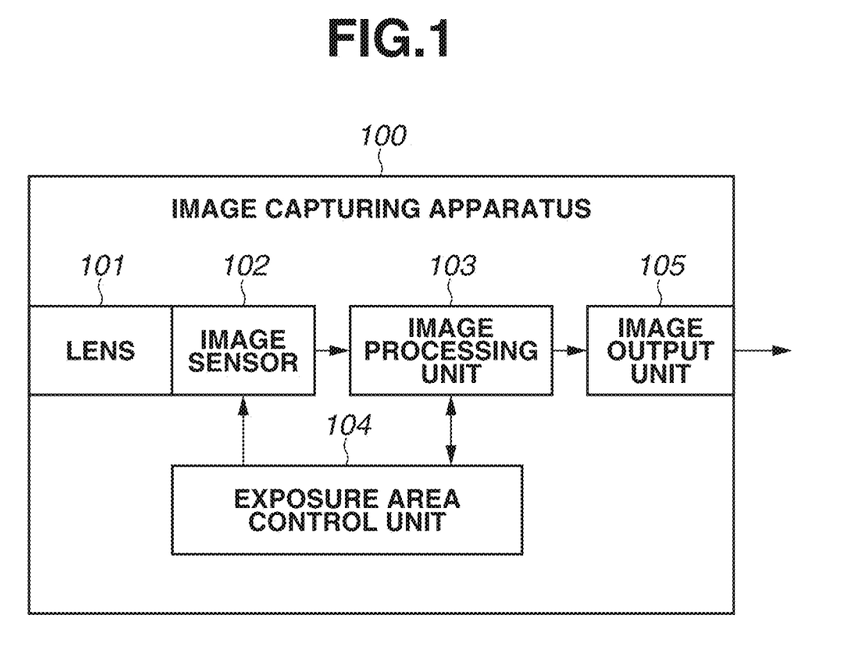
FIG. 1 is a configuration diagram of an image capturing apparatus according to a first exemplary embodiment.

A configuration of an image capturing apparatus 100 according to the present exemplary embodiment is described with reference to FIG. 1. FIG. 1 is a configuration diagram of the image capturing apparatus 100 according to the present exemplary embodiment. The image capturing apparatus 100 includes a lens 101, an image sensor 102, an image processing unit 103, an exposure area control unit 104, and an image output unit 105.

The lens 101 receives light within an image capturing viewing angle, and collects the light to the image sensor 102.

The image sensor 102 photoelectrically converts the collected light into an image signal, and transmits the image signal to the image processing unit 103. Further, the image sensor 102 includes color filters of red (R), green (G), and blue (B), and generates the image signal having RGB color information. The image sensor 102 can change an exposure condition for each of areas (hereinafter, referred to as exposure areas) each including a single pixel or a plurality of pixels. The detail of the image sensor 102 is described below with reference to FIG. 2.

The image processing unit 103 performs image processing including development processing on the image signal as a digital signal. The image processing unit 103 converts the image signal into image data (in a Joint Photographic Experts Group (JPEG) format or the like). At this time, the image signal, which has been transmitted from the image sensor 102, having the RGB color information is converted into a color-difference signal in a YUV format or the like, and the color-difference signal is then subjected to digital signal processing. The image signal is finally converted (developed) as image data, and the image data is output through the image output unit 105. The development processing includes white balance correction, saturation correction, color tone correction, sharpness correction, gamma correction, and gradation correction. The white balance is not a fixed development parameter, and the white balance evaluation value (development parameter) is calculated from the image signal. The white balance correction is performed by applying the calculated development parameter. Further, the image processing unit 103 can calculate luminance information and color-difference information by performing YUV conversion. An exposure condition achieving proper exposure is determined based on the luminance information. The exposure condition is determined by an exposure time and an analog gain value of the image sensor 102. The calculated exposure condition is transmitted to the exposure area control unit 104. Further, the white valance evaluation value is calculated based on the luminance information and the color-difference information.

The exposure area control unit 104 assigns the exposure condition to each of the exposure areas, and controls the image sensor 102. To improve a dynamic range to brightness of an object, the exposure area control unit 104 sets the exposure condition (the exposure time and the analog gain) such that, for example, an average luminance value in each of the exposure areas becomes a center value of an outputtable data gradation.

The image output unit 105 is an interface relating to distribution of the image data, and can output the image data from the image capturing apparatus 100 through, for example, a network.

Figure 2:
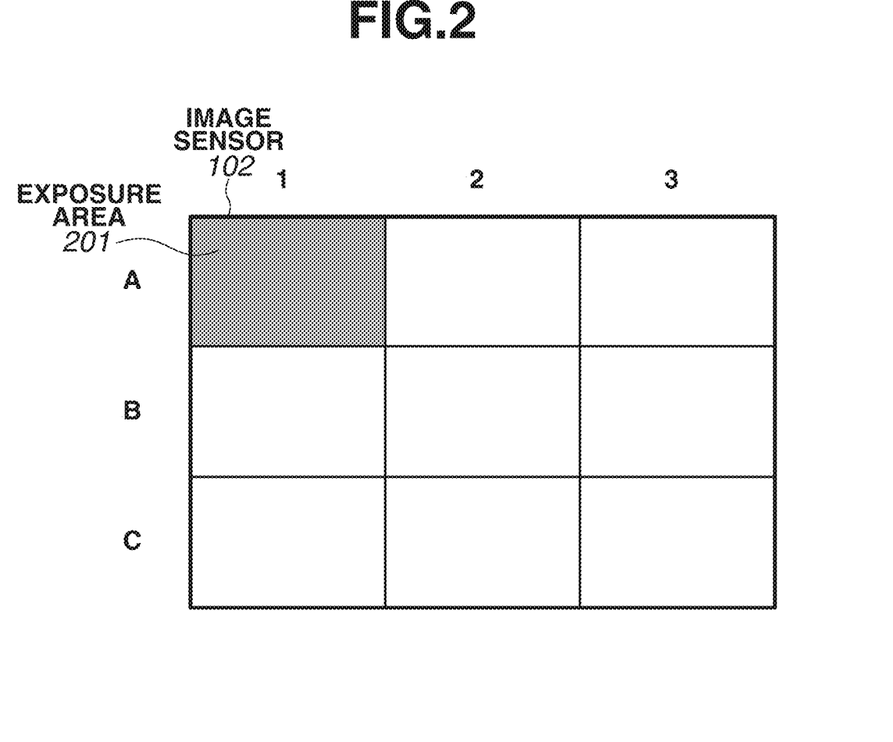
FIG. 2 is a diagram illustrating relationship between an image sensor and an exposure area according to the present exemplary embodiment.

The exposure areas of the image sensor 102 according to the present exemplary embodiment are described with reference to FIG. 2. FIG. 2 is a diagram illustrating relationship between the image sensor 102 and an exposure area 201. In FIG. 2, the image sensor 102 is divided into nine exposure areas. To make description clear, the exposure area 201 of the image sensor 102 is described by using symbols A, B, and C corresponding to illustrated rows and numerals 1, 2, and 3 corresponding to illustrated columns. For example, an exposure area A1 in FIG. 2 corresponds to the exposure area at upper left of the image sensor 102, and an exposure area B2 corresponds to the exposure area at a center of the image sensor 102. The exposure condition (the exposure time and the analog gain) is independently settable to each of the nine exposure areas. Further, positional information on pixels corresponding to the exposure areas in the image sensor 102 is transmitted to the image processing unit 103 and the exposure area control unit 104, and is used for image processing and calculation of the evaluation value. The image processing unit 103 can perform image processing including calculation of the evaluation value from the image signal and the development processing on each of the exposure areas.

Figure 3:
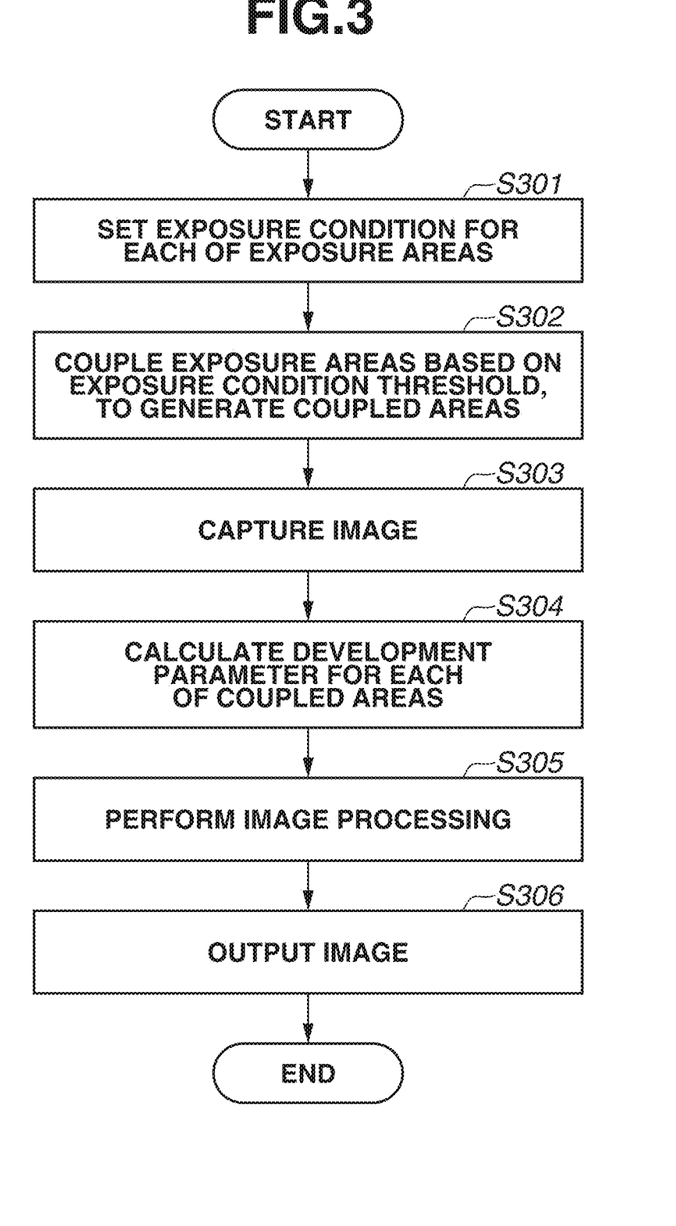
FIG. 3 is a flowchart according to the present exemplary embodiment.

The development processing according to the present exemplary embodiment is described with reference to FIG. 3. FIG. 3 is a flowchart illustrating a procedure of the development processing according to the present exemplary embodiment. Steps are described below.

In step S301, the exposure area control unit 104 determines the exposure condition for each of the exposure areas based on the luminance information of each of the exposure areas. At this time, the exposure condition is independently controlled so as to achieve proper exposure in each of the exposure areas. The luminance information is calculated from the image signal of a preceding frame. The exposure conditions controlled by the exposure area control unit 104 are set to the image sensor 102.

In step S302, the exposure areas are coupled based on a threshold of the exposure condition to generate coupled areas. The exposure areas can be divided into a bright object area and a dark object area based on the threshold of the exposure condition. In other words, the coupled areas that are divided based on the different light sources can be generated.

The detailed description of the threshold of the exposure condition and a method of calculating the brightness of the object are described below. It is determined whether the brightness of the object is brighter than or darker than the threshold for each of the exposure areas. The areas having the brightness brighter than the threshold are collected and referred to as a bright coupled area, and the areas having the brightness darker than the threshold are collected and referred to as a dark coupled area.

Figure 4:
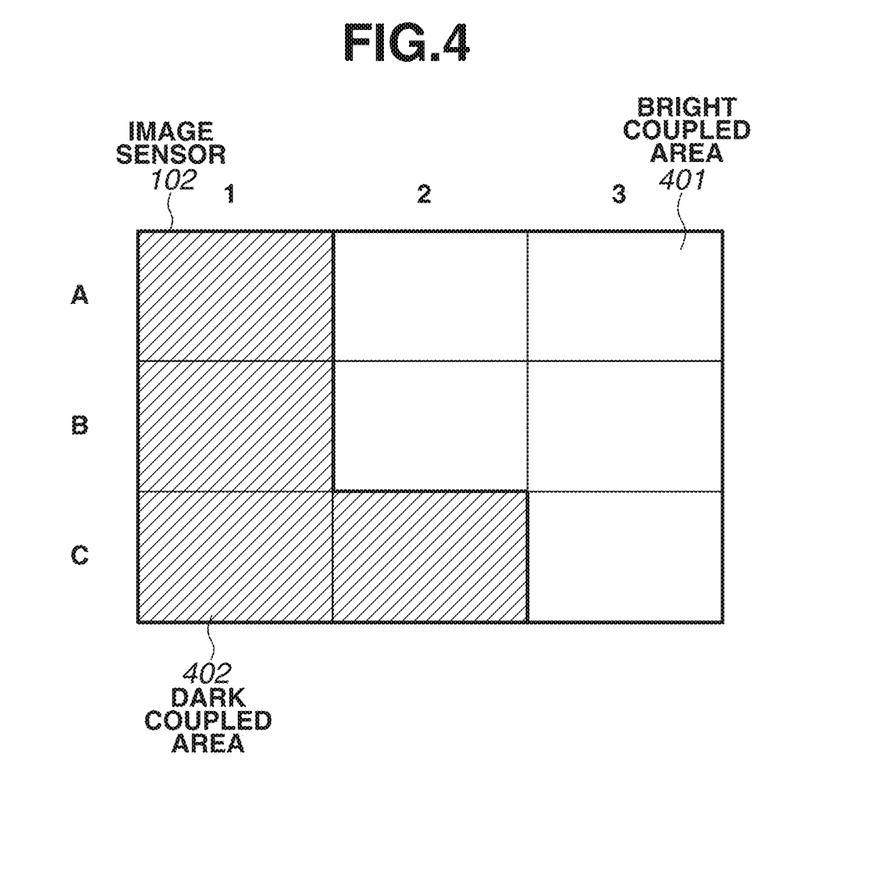
FIG. 4 is a diagram illustrating relationship between the image sensor and coupled areas according to the present exemplary embodiment.

The bright coupled area and the dark coupled area are supplementarily described with reference to FIG. 4.

In step S303, an image is captured with the set exposure conditions.

In step S304, the image sensor 102 transmits a signal of the captured image to the image processing unit 103. The image processing unit 103 calculates the white balance evaluation value for each of the coupled areas from the signal of the captured image. In addition, at this time, the image processing unit 103 calculates the luminance information for each of the exposure areas, and transmits the luminance information to the exposure area control unit 104, thereby enabling setting of the exposure conditions for a next frame.

In step S305, the white balance correction is performed on each of the coupled areas. In addition, at this time, development processing other than the white balance correction is also performed on each of the exposure areas.

In step S306, a developed image is output.

The coupled areas according to the present exemplary embodiment are described with reference to FIG. 4. FIG. 4 is a diagram illustrating relationship between the image sensor 102 and the coupled areas. FIG. 4 illustrates the exposure areas of the image sensor 102 as in FIG. 2. The brightness of the object for each of the exposure areas is estimated from the average luminance value and setting of the exposure condition for each of the exposure areas. At this time, since the exposure conditions of the image sensor 102 are set such that the luminance values are equal among the exposure areas, the brightness of the object can be estimated by referring to the exposure conditions. More specifically, an area having the exposure time that is twice the exposure time of a certain area has the brightness that is ½ times the brightness of the certain area, and an area having the analog gain that is twice the analog gain of a certain area has the brightness that is ½ times the brightness of the certain area. In the present exemplary embodiment, the exposure condition is represented by an expression 001 as below. The exposure condition is denoted by X, the exposure time is denoted by T, and the analog gain is denoted by G. At this time, the exposure time T and the analog gain G are normalized to the brightness of an object, and weighting of the exposure time is equal to weighting of the analog gain G. In other words, the value X becomes the same value at T:G=2:1 and at T:G=1:2, $$X = T \times G.$$ Expression 001

At this time, a threshold Xth for the exposure condition X is provided to generate a coupled area. The exposure condition X is independently held for each of the exposure areas. Accordingly, as illustrated in FIG. 4, an area where the exposure condition X is less than the threshold Xth is included in a bright coupled area 401 (white areas A2, A3, B2, B3, and C3 in FIG. 4). In contrast, an area where the exposure condition X is greater than the threshold Xth is included in a dark coupled area 402 (hatched areas A1, B1, C1, and C2 in FIG. 4). The exposure areas included in the same coupled area are close in brightness of an object to be captured, and are illuminated by the same light source with high possibility. Therefore, the white balance evaluation value is acquired for each of the coupled areas. Further, the white balance evaluation value is applied to each corresponding coupled area, and white balance correction is performed with a digital gain.

As described above, the white balance evaluation value can be calculated for each of the coupled areas that are areas illuminated by different light sources with high possibility. Further, applying the calculated white balance evaluation value for each of the exposure areas (or coupled areas) makes it possible to generate an image in which the appropriate white balance correction is applied for each of the areas illuminated by the different light sources.

In the following, the first exemplary embodiment is supplementarily described.

The white balance correction can be performed not on each of the coupled areas but on each of the exposure areas. For example, since the exposure condition is different depending on the exposure area, there is a case where the development processing such as data compression is performed on each of the exposure areas. At this time, the development processing including the white balance correction is collectively performed on each of the exposure areas, which can facilitate signal processing.

The method of calculating the white balance evaluation value is supplementarily described. To calculate the white balance evaluation value, a ratio of RGB is calculated for each of the coupled areas. Thus, the number of samples is increased and accuracy is improved as the number of pixels is larger. In other words, in a case where the coupled areas are fine, the number of samples is reduced and accuracy is lowered. Accordingly, it is desirable to determine the minimum size (minimum number of pixels) of one coupled area.

In a case where the number of pixels with underexposure or overexposure is large, the proper white balance evaluation value cannot be calculated. Accordingly, it is desirable to calculate the white balance evaluation value from the pixel having intermediate luminance or the image signal of the exposure areas.

Further, in a case where color deviation of the object is large, the proper white balance evaluation value cannot be calculated. Thus, an area from which the evaluation value is to be calculated can be limited to an achromatic color area in the coupled areas. At this time, it is considered that the color deviation is large and the achromatic color of the object is not detected. In this case, it is desirable to mitigate the threshold of the exposure condition of the coupled area where the achromatic color is not detected. This enables detection of the achromatic color, and enables proper white balance correction.

The method of generating the coupled areas is supplementarily described. Generation of the coupled areas can be limited to a case where the exposure areas are adjacent to each other. In the case where generation of the coupled areas is limited to the exposure areas adjacent to each other, the exposure areas are limited to areas close to each other at least in an image. Therefore, the areas are illuminated by the same light source with high possibility. This improves accuracy of the white balance evaluation value.

A case where generation of the coupled areas is not limited to the exposure areas adjacent to each other also has an advantage. There is a case where a captured scene has a depth, an object is present on a front side, and a background area is divided by the object. At this time, in the case where generation of the coupled areas is not limited to the exposure areas adjacent to each other, the divided background areas can be determined as the same coupled area. As a result, the number of samples in the coupled area is increased and accuracy is improved.

The threshold of the exposure condition is supplementarily described. A plurality of thresholds Xth can be provided for the exposure condition X. Providing the plurality of thresholds Xth enables the proper white balance correction even in a case where three or more different light sources are present.

The threshold of the exposure condition can be an absolute value or a relative value. In a case of using the absolute value, it is desirable to previously set the threshold of the exposure condition such that the bright object and the dark object are separated. In this case, since the threshold is previously determined, a calculation load is reduced.

In the case of using the relative value, for example, the maximum value and the minimum value are calculated from the exposure condition, and a center value is set as the threshold. This makes it possible to generate a proper coupled area corresponding to an image capturing scene, which improves accuracy of the white balance correction. Alternatively, a histogram can be obtained from brightness estimation for each of the pixels and a value at a valley of the histogram (having brightness difference) can be used as the threshold.

The exposure condition is supplementarily described. As the image capturing apparatus has a single optical system, the brightness of an object for each of the exposure areas can be predicted from the luminance information for each of the exposure areas and the exposure condition for each of the exposure areas. For example, in a case of the same exposure condition, the luminance information and the brightness of the object are proportional to each other. It can be predicted that the exposure area having the luminance information that is twice the luminance information of a certain area has the brightness of the object that is twice the brightness of the certain area.

The analog gain can be converted into International Organization for Standardization (ISO) sensitivity. The analog gain can be converted into the ISO sensitivity based on optical characteristics of the image sensor 102. Further, as an aperture value (F-number) is fixed in the image sensor 102, in a case where the ISO sensitivity and the aperture value are known in addition to the exposure condition X, it is possible to estimate the brightness of the object.

The processing in FIG. 3 is supplementarily described. In FIG. 3, in a case where images are successively captured, the exposure condition is set for each of the exposure areas based on the luminance information acquired in step S304. This makes it possible to capture the images with the exposure condition reflecting the brightness of the object in one preceding frame.

The white balance evaluation value is supplementarily described.

The temporal reflection of the white balance evaluation value is desirably performed based on the change speed of the exposure condition. In a case where the exposure condition is steeply changed, the light source is changed with high possibility, so that the white balance correction is also steeply performed. In a case where the exposure condition is gently changed, it is desirable to gently perform the white balance correction in a similar manner. As described above, the white balance correction is performed based on the change speed of the exposure condition, which leads to natural change of the color appearance in a moving image.

Suppressing the frequency of the white balance correction makes it possible to reduce a load on the image processing unit 103. Performing the white balance correction on the coupled area where the exposure condition is changed makes it possible to reduce the load on the image processing unit 103. At this time, a threshold can be set for a change amount of the exposure condition of the exposure area, and the change amount at which the white balance correction is to be performed again (development parameter is acquired and applied again) can be previously determined. Further, in a case where the white balance correction is not performed, it is unnecessary to calculate the evaluation value.

In the present exemplary embodiment, the coupled areas are provided and the different white balance evaluation values are applied to the respective coupled areas. However, if the white balance evaluation value is drastically varied at a boundary of the coupled areas, an unnatural image is generated. Thus, at the boundary of the coupled areas, gradual variation is desirably applied to the white balance evaluation value to smoothly change the color appearance. For example, the white balance evaluation value at a center of the boundary can be regarded as an average value of the adjacent coupled areas, and the evaluation value can be smoothly varied up to 50 pixels inside each of the coupled areas. Further, a range of the gradual variation is desirably widened as the difference of the white balance evaluation value between the adjacent coupled areas is larger. This leads to smooth variation of the evaluation value, which generates a natural image.

In the description with reference to FIG. 1, the exposure area control unit 104 is described as an independent block; however, the exposure area control unit 104 can be a part of the function of the image sensor 102 or the image processing unit 103. Further, in the description of the control by the exposure area control unit 104, the control example in which the average luminance value is the center value of the data gradation is described; however, the control is not limited thereto. It is sufficient to determine the exposure condition that reduces underexposure and overexposure.

In the description with reference to FIG. 2, the example in which the nine exposure areas 201 are provided is described; however, the present exemplary embodiment is applicable as long as two or more exposure areas are provided. Further, a single pixel can be regarded as one exposure area.

In the first exemplary embodiment, the case where the entire development processing is performed by the image processing unit 103 is described. In a second exemplary embodiment, a case where the development processing is partially performed by the image sensor 102 is described. Further, in the second exemplary embodiment, descriptions of the contents already described in the first exemplary embodiment are omitted.

The image signal of the image sensor 102 including a plurality of exposure areas used in the present exemplary embodiment is different in exposure condition for each of the exposure areas, so that the processing by the image processing unit 103 is complicated. Thus, the processing for each of the exposure areas cannot be performed by the general-purpose image processing in some cases. In the second exemplary embodiment, the image sensor 102 including the plurality of exposure areas includes a part of the image processing function described in the first exemplary embodiment. Accordingly, even the general-purpose image processing unit 103 can perform the development processing.

Figure 5:
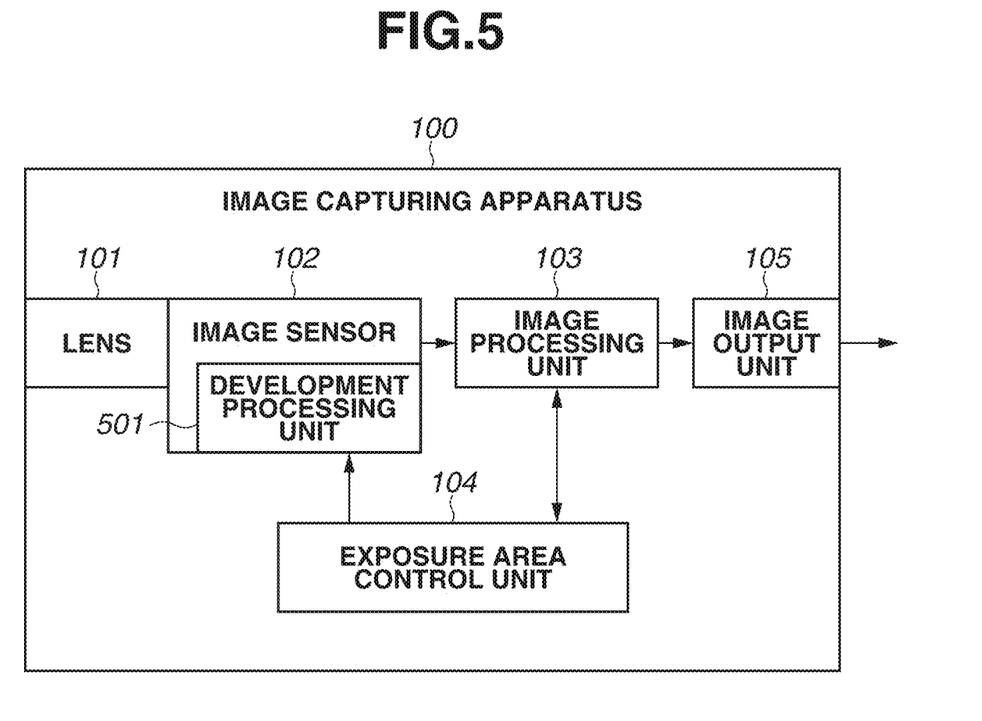
FIG. 5 is a configuration diagram of an image capturing apparatus according to a second exemplary embodiment.

The image capturing apparatus 100 provided with the image sensor 102 including a development processing unit according to the second exemplary embodiment is described with reference to FIG. 5. FIG. 5 is a configuration diagram of the image capturing apparatus 100 provided with the image sensor 102 including a development processing unit 501 according to the present exemplary embodiment. Descriptions of the lens 101, the image output unit 105, and the exposure area control unit 104 are omitted because these units are the same as those in the first exemplary embodiment.

The image sensor 102 in FIG. 5 includes the development processing unit 501. The image sensor 102 photoelectrically converts light collected through the color filters, into an RGB image signal. The image sensor 102 is a stacked sensor, and includes the development processing unit 501 that is a circuit performing the digital signal processing. The development processing unit 501 converts the RGB signal into a YUV signal (the luminance information and the color-difference information). At this time, the brightness of an image is desirably corrected (hereinafter, referred to as brightness correction) by a digital gain based on the exposure condition for each of the exposure areas. In the brightness correction, the brightness of each of the exposure areas is corrected by the digital gain such that the dark area is darkened and the bright area is brightened in the entire image.

The white balance correction is desirably performed before the brightness correction. The white balance correction based on the coupled areas described in the first exemplary embodiment is performed before the brightness correction. As a result, the proper white balance is applied to each of the exposure areas. The digital gain of the brightness correction is applied in this state. This enables the white balance correction without changing the color appearance after development.

The image sensor 102 transmits the image signal, which has undergone the brightness correction, to the image processing unit 103. At this time, the image sensor 102 can output the YUV signal as is, or can convert the YUV signal into the RGB signal again. Since the image processing unit 103 handles the image signal corrected in brightness, the image processing unit 103 can process the signal in a manner similar to a case where the exposure condition is uniformly set in the image sensor 102. Therefore, even the general-purpose image processing unit can perform the processing.

If the white balance correction is performed after the brightness correction, the color appearance is changed in each of the exposure areas by the digital gain of the brightness correction. As a result, the proper white balance correction cannot be performed.

As described above, in a case where the image sensor 102 includes the development processing unit 501 and outputs the image signal subjected to the white balance correction for each of the coupled areas, even the general-purpose image processing unit 103 can perform the development processing. Further, even the general-purpose image processing unit 103 can generate an image subjected to the proper white balance correction.

The output format of the image sensor 102 is supplementarily described. When the image sensor 102 outputs the YUV signal as is, it is possible to omit the processing by the image processing unit 103 to convert the RGB signal into the YUV signal. The data conversion from the RGB signal is not limited to the YUV format. The RGB signal can be converted into another format of the color-difference signal such as YCrCb.

Further, when the image sensor 102 again converts the YUV signal into the RGB signal and outputs the RGB signal, the image sensor 102 can output a signal in a general-purpose format. This makes it possible to facilitate software development for an image signal input in the image processing unit 103.

The image sensor 102 can generate a coupled area map showing a size and a position of each of the coupled areas, besides the image signal, and transmit the coupled area map to the image processing unit 103. As a result, the image processing unit 103 can perform image processing and data extraction of the image signal based on the coupled area map.

In the brightness correction, processing to compress a data amount (gradation) can be performed besides the development processing. A part or a whole of the processing performed by the image processing unit 103 can be performed by the development processing unit 501. Further, the brightness correction can be performed by the image processing unit 103, and the functions of the development processing unit 501 and the image processing unit 103 can be freely changed.

The brightness correction is supplementarily described. In the image sensor 102, the exposure condition achieving proper exposure is set to each of the exposure areas. Accordingly, in a case where the brightness correction by the digital gain is not performed, an image having no brightness gradation as a whole is generated. Performing the brightness correction enables representation of an image in which the bright object is brightened and the dark object is darkened.

The exemplary embodiments are described above; however, the present disclosure is not limited to these exemplary embodiments, and various modifications and alternations can be made within the scope of the spirit of the present disclosure.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-054574, filed Mar. 29, 2021, which is hereby incorporated by reference herein in its entirety.

What is claimed is:

1. An image capturing apparatus, comprising:
an image sensor configured to change an exposure condition for each of a plurality of exposure areas, each of the exposure areas including a single pixel or a plurality of pixels, wherein the exposure condition includes at least one of an exposure time or an analog gain; and
an image processing unit configured to perform digital signal processing on a signal of a captured image, the digital signal processing comprising:
generating a plurality of coupled areas in which the exposure areas are coupled based on a first threshold of the exposure condition,
calculating a parameter for each of the coupled areas, the parameter being used to correct the captured image, and correcting the captured image, based on the parameter, for each of the exposure areas.

2. The image capturing apparatus according to claim 1, the digital signal processing further comprising correcting the captured image, based on the parameter, for each of the coupled areas.

3. The image capturing apparatus according to claim 1, the digital signal processing further comprising calculating the parameter that is relating to color correction.

4. The image capturing apparatus according to claim 1, wherein calculating the parameter includes calculating a white balance gain.

5. The image capturing apparatus according to claim 1, wherein the digital signal processing further comprising generating each of the coupled areas from the exposure areas adjacent to each other.

6. The image capturing apparatus according to claim 1, the digital signal processing further comprising generating each of the coupled areas without being limited to the exposure areas adjacent to each other.

7. The image capturing apparatus according to claim 1, the digital signal processing further comprising calculating the parameter so that the parameter changes gradually at a boundary between the coupled areas.

8. The image capturing apparatus according to claim 7, the digital signal processing further comprising calculating the parameter so that a range of the parameter changing gradually at the boundary between the coupled areas is widened as a difference of the exposure condition between the coupled areas is larger.

9. The image capturing apparatus according to claim 1, the digital signal processing further comprising determining an correction frequency of the parameter based on a change speed of the exposure condition.

10. The image capturing apparatus according to claim 1, the digital signal processing further comprising recalculating the parameter or recorrecting the captured image based on the parameter in the coupled area where change of the exposure condition exceeds a second threshold.

11. The image capturing apparatus according to claim 1, wherein the image sensor includes a processing unit and outputs an RGB signal or a color-difference signal to which the parameter is applied.

12. The image capturing apparatus according to claim 1, wherein the image sensor generates and outputs a coupled area map.

13. The image capturing apparatus according to claim 1, wherein each of the coupled areas includes at least two of the exposure areas.

14. The image capturing apparatus according to claim 1, wherein, in the coupled area not including an achromatic color area, the first threshold is mitigated to increase the coupled area.

15. A method of controlling an image capturing apparatus including an image sensor configured to change an exposure condition for each of a plurality of exposure areas, each of the exposure areas including a single pixel or a plurality of pixels, wherein the exposure condition includes at least one of an exposure time or an analog gain, the method comprising:
performing digital signal processing on a signal of a captured image;
generating a plurality of coupled areas in which the exposure areas are coupled based on a first threshold of the exposure condition;

calculating a parameter for each of the coupled areas, the parameter being used to correct the captured image; and correcting the captured image, based on the parameter to an image processing unit for each of the exposure areas.

16. The method of controlling the image capturing apparatus according to claim 15, further comprising correcting the captured image, based on the parameter, for each of the coupled areas.

17. The method of controlling the image capturing apparatus according to claim 15, wherein the parameter is relating to color correction.

18. The method of controlling the image capturing apparatus according to claim 15, wherein the parameter includes a white balance gain.

19. A non-transitory computer-readable storage medium that stores a method of controlling an image capturing apparatus including an image sensor configured to change an exposure condition for each of a plurality of exposure areas, each of the exposure areas including a single pixel or a plurality of pixels, wherein the exposure condition includes at least one of an exposure time or an analog gain, the method comprising:

performing digital signal processing on a signal of a captured image;

generating a plurality of coupled areas in which the exposure areas are coupled based on a first threshold of the exposure condition;

calculating a parameter for each of the coupled areas, the parameter being used to correct the captured image; and correcting the captured image, based on the parameter, for each of the exposure areas.

* * * * *